(12) United States Patent
Ishino

(10) Patent No.: US 11,936,298 B2
(45) Date of Patent: Mar. 19, 2024

(54) DRIVE CIRCUIT OF HIGH-SIDE TRANSISTOR, SWITCHING CIRCUIT, AND CONTROLLER OF DC/DC CONVERTER

(71) Applicant: ROHM CO., LTD., Kyoto (JP)

(72) Inventor: Tsutomu Ishino, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 168 days.

(21) Appl. No.: 17/696,456

(22) Filed: Mar. 16, 2022

(65) Prior Publication Data
US 2022/0302839 A1 Sep. 22, 2022

(30) Foreign Application Priority Data

Mar. 18, 2021 (JP) .................. 2021-045006

(51) Int. Cl.
| | |
|---|---|
| *H02M 3/158* | (2006.01) |
| *G05F 3/26* | (2006.01) |
| *H02M 1/08* | (2006.01) |
| *H02M 1/00* | (2006.01) |
| *H02M 1/36* | (2007.01) |

(52) U.S. Cl.
CPC ............ *H02M 3/158* (2013.01); *G05F 3/26* (2013.01); *H02M 1/08* (2013.01); *H02M 1/0006* (2021.05); *H02M 1/36* (2013.01)

(58) Field of Classification Search
CPC ...... H02M 3/158; H02M 1/0006; H02M 1/36; H02M 7/5387; H02M 3/135; H03K 17/687; H03K 17/102; H03K 17/66; H03K 17/693
See application file for complete search history.

(56) References Cited

U.S. PATENT DOCUMENTS

| | | | |
|---|---|---|---|
| 7,227,400 B1* | 6/2007 | Gillespie .......... | H03K 19/01707 327/333 |
| 7,323,912 B2* | 1/2008 | Nielsen ................ | H03K 17/063 327/333 |
| 7,893,730 B2* | 2/2011 | Jung .............. | H03K 19/018521 327/333 |
| 8,723,552 B2* | 5/2014 | Tseng ............... | H03K 19/00361 326/82 |

(Continued)

FOREIGN PATENT DOCUMENTS

| | | |
|---|---|---|
| JP | 2012070333 A | 4/2012 |
| JP | 2020088842 A | 6/2020 |

*Primary Examiner* — Yusef A Ahmed
(74) *Attorney, Agent, or Firm* — CANTOR COLBURN LLP

(57) ABSTRACT

The present disclosure relates to a high-side transistor drive circuit, a switching circuit and a controller of a DC/DC converter. A pulse generator generates a first pulse that becomes high level for a certain period of time in response to a first edge of an input signal and a second pulse that becomes high level for a certain period of time in response to a second edge of the input signal. An open drain circuit has a first output node that becomes low level in response to the first pulse and a second output node that becomes low level in response to the second pulse. A first current mirror circuit folds back a first current flowing through the first output node of the open drain circuit. A second current mirror circuit folds back a second current flowing through the second output node of the open drain circuit.

14 Claims, 9 Drawing Sheets

(56) References Cited

U.S. PATENT DOCUMENTS

| | | | |
|---|---|---|---|
| 8,933,714 B2* | 1/2015 | Akahane | H03K 17/145 |
| | | | 324/705 |
| 9,595,967 B2* | 3/2017 | Goto | H03K 19/017509 |
| 9,722,610 B2* | 8/2017 | Akahane | H03K 17/04123 |
| 10,116,297 B1* | 10/2018 | Wu | H03K 17/687 |
| 10,833,672 B2* | 11/2020 | Niikura | H03K 17/102 |
| 11,626,877 B2* | 4/2023 | Niikura | H02M 1/08 |
| | | | 323/282 |
| 2008/0111610 A1* | 5/2008 | Takenaka | H03K 19/018521 |
| | | | 327/333 |
| 2012/0081149 A1* | 4/2012 | Akahane | H03K 19/018521 |
| | | | 326/80 |
| 2016/0248404 A1* | 8/2016 | Goto | H03K 19/017509 |
| 2017/0346402 A1* | 11/2017 | Ishino | H02M 3/1588 |
| 2019/0013725 A1* | 1/2019 | Shinozaki | H02M 3/1588 |
| 2020/0044652 A1* | 2/2020 | Yamaji | H03K 17/08128 |
| 2020/0153426 A1* | 5/2020 | Niikura | H03K 17/223 |
| 2020/0162074 A1* | 5/2020 | Niikura | H03K 17/04123 |
| 2020/0382122 A1* | 12/2020 | Niikura | H02M 3/155 |
| 2022/0209764 A1* | 6/2022 | Guan | H02M 1/32 |
| 2022/0302842 A1* | 9/2022 | Ishino | H02M 1/08 |
| 2022/0321116 A1* | 10/2022 | Niikura | H02M 1/32 |

* cited by examiner

<PRIOR ART>

DRIVE CIRCUIT OF HIGH-SIDE TRANSISTOR, SWITCHING CIRCUIT, AND CONTROLLER OF DC/DC CONVERTER

CROSS REFERENCES TO RELATED APPLICATIONS

The present invention claims priority under 35 U.S.C. § 119 to Japanese Application, 2021-045006, filed on Mar. 18, 2021, the entire contents of which being incorporated herein by reference.

TECHNICAL FIELD

The present disclosure relates to a high-side transistor drive circuit.

BACKGROUND

In various applications such as DC/DC converters, power conversion devices or motor drive circuits, a switching circuit including a power transistor and its drive circuit (gate drive circuit) are used.

FIG. 1 shows a circuit diagram of a switching circuit. A switching circuit 100R has a high-side transistor MH, a low-side transistor ML, a high-side drive circuit 200R and a low-side drive circuit 110.

The high-side transistor MH is disposed between an input terminal (or an input line) IN and a switching terminal (or a switch line) VS, and the low-side transistor ML is disposed between the switching terminal VS and a ground terminal GND. The high-side drive circuit 200R drives the high-side transistor MH according to a control input HIN, and the low-side drive circuit 110 drives the low-side transistor ML according to a control input LIN.

When the high-side transistor MH is on and the low-side transistor ML is off, an input voltage $V_{IN}$ is generated in the switching terminal VS; when the high-side transistor MH is off and the low-side transistor ML is on, a ground voltage $V_{GND}$ (0 V) is generated in the switching terminal VS. While both the high-side transistor MH and the low-side transistor ML are off, the switching terminal VS becomes a high impedance. The switching circuit 100R supplies power to a load (not shown) by switching among these three states.

An N-type (N-channel) transistor is sometimes used as the high-side transistor MH. To turn on the high-side transistor MH and to keep it in an on state, a voltage exceeding a gate threshold $V_{GS(th)}$ of a field-effect transistor (FET) needs to be applied between its gate and source. When the high-side transistor MH is on, a voltage $V_S$ of the switch line VS, that is, the source voltage of the high-side transistor MH, is substantially equal to the input voltage $V_{IN}$, and a gate signal higher than $V_{IN}+V_{GS(th)}$ needs to applied to the gate of the high-side transistor MH in order to keep the high-side transistor MH in the on state.

Moreover, a bootstrap circuit is provided to generate the gate signal higher than the input voltage $V_{IN}$. The bootstrap circuit includes a bootstrap capacitor C1 and a rectifier element D1. The bootstrap capacitor C1 is disposed between a bootstrap terminal (or a bootstrap line) VB and the switching terminal VS. A direct current (DC) voltage $V_{REG}$ ($>V_{GS(th)}$) is applied to the bootstrap terminal VB via the rectifier element D1. The bootstrap line VB becomes a high-side power supply line, and the switching line VS becomes a high-side ground line (a reference potential).

When the switching voltage $V_S$ is low (0 V), the capacitor C1 is charged via the rectifier element D1, and a voltage between two ends thereof becomes $\Delta V = V_{REG} - Vf$. Vf is a voltage drop of the rectifier element D1. If the switching voltage $V_S$ increases, the voltage $V_B$ of the bootstrap terminal VB is kept at $V_B = V_S + \Delta V$ while it increases. A potential difference between the terminal VB and the terminal VS is kept to be $\Delta V$ using the bootstrap circuit.

The high-side drive circuit 200R includes a buffer (a driver) 210 and a level shift circuit 220. The voltage $V_B$ is supplied to an upper-side power terminal of the buffer 210, and the voltage $V_S$ is supplied to its lower-side power terminal. The buffer 210 supplies a gate voltage that causes $V_B$ to be high level and $V_S$ to be low level to the gate of the high-side transistor MH.

The level shift circuit 220 converts a binary control signal HIN at a logic level ($V_{DD}$–0 V) to a binary intermediate signal LVSFTOUT at a level $V_B$–$V_S$.

PRIOR ART DOCUMENT

Patent Publication

[Patent document 1] Japan Patent Publication No. 2012-70333
[Patent document 2] Japan Patent Publication No. 2020-088842

SUMMARY OF THE PRESENT DISCLOSURE

Problems to be Solved by the Present Disclosure

In an application where the voltage of a high-side power supply line becomes tens or hundreds of volts, even a minute current can result in large power consumption. Therefore, minimizing a stable-state current in a drive circuit is desired.

The present disclosure is completed in view of the issue above. It is an illustrative object of one aspect of the present disclosure to provide a drive circuit with reduced power consumption.

Technical Means for Solving the Problem

The present disclosure in one aspect relates to a drive circuit which is an N-channel or NPN type high-side transistor drive circuit. The drive circuit includes: a level shift circuit, level-shifting an input signal to a signal that sets a voltage of a high-side power supply line to a high level and a voltage of a high-side ground line to a low level; and a buffer, driving the high-side transistor according to an output of the level shift circuit. The level shift circuit includes: a pulse generator, generating a first pulse that becomes high level for a certain period of time in response to a first edge of the input signal and a second pulse that becomes high level for a certain period of time in response to a second edge of the input signal; an open drain circuit, in which a first output node becomes low level in response to the first pulse and a second output node becomes low level in response to the second pulse; a first current mirror circuit, having an input node connected to the first output node of the open drain circuit, and folding back a first current flowing through the first output node of the open drain circuit; a second current mirror circuit, having an input node connected to the second output node of the open drain circuit, and folding back a second current flowing through the second output node of the open drain circuit; and a first latch circuit, of which a state is changed in response to a third current that is an output of the first current mirror circuit, and a fourth current that is an output of the second current mirror circuit.

The present disclosure in another aspect also relates to a drive circuit. The drive circuit includes: a pulse generator, generating a first pulse that becomes high level for a certain period of time in response to a first edge of an input signal and a second pulse that becomes high level for a certain period of time in response to a second edge of the input signal; a first transistor, being a high breakdown voltage element, and having a gate that receives the first pulse; a second transistor, being a high breakdown voltage element, and having a gate that receives the second pulse; a third transistor, disposed between a source and a ground of the first transistor, and having a gate biased by constant voltage; a fourth transistor, disposed between a source and a ground of the second transistor, and having a gate biased by constant voltage; a first current mirror circuit, connected to a high-side power supply line and having an input node connected to a drain of the first transistor; a second current mirror circuit, connected to the high-side power supply line and having an input node connected to a drain of the second transistor; a first inverter, disposed between the high-side power supply line and a high-side ground line, and having an input node connected to an output node of the first current mirror circuit; and a second inverter, disposed between the high-side power supply line and the high-side ground line, having an input node connected to an output node of the second current mirror circuit and an output node of the first inverter, and having an output node connected to an input node of the first inverter.

Moreover, configurations obtained from any combination of the elements above, and configurations obtained from conversions between expressions of the elements in terms of methods, devices and systems of the present disclosure may also effectively serve as aspects of the present disclosure.

Effects of the Present Disclosure

The present disclosure in one aspect is capable of reducing the number of high breakdown voltage elements in a high-side transistor drive circuit.

DETAILED DESCRIPTION OF THE EMBODIMENTS

Summary of the Embodiments

Figure 1:
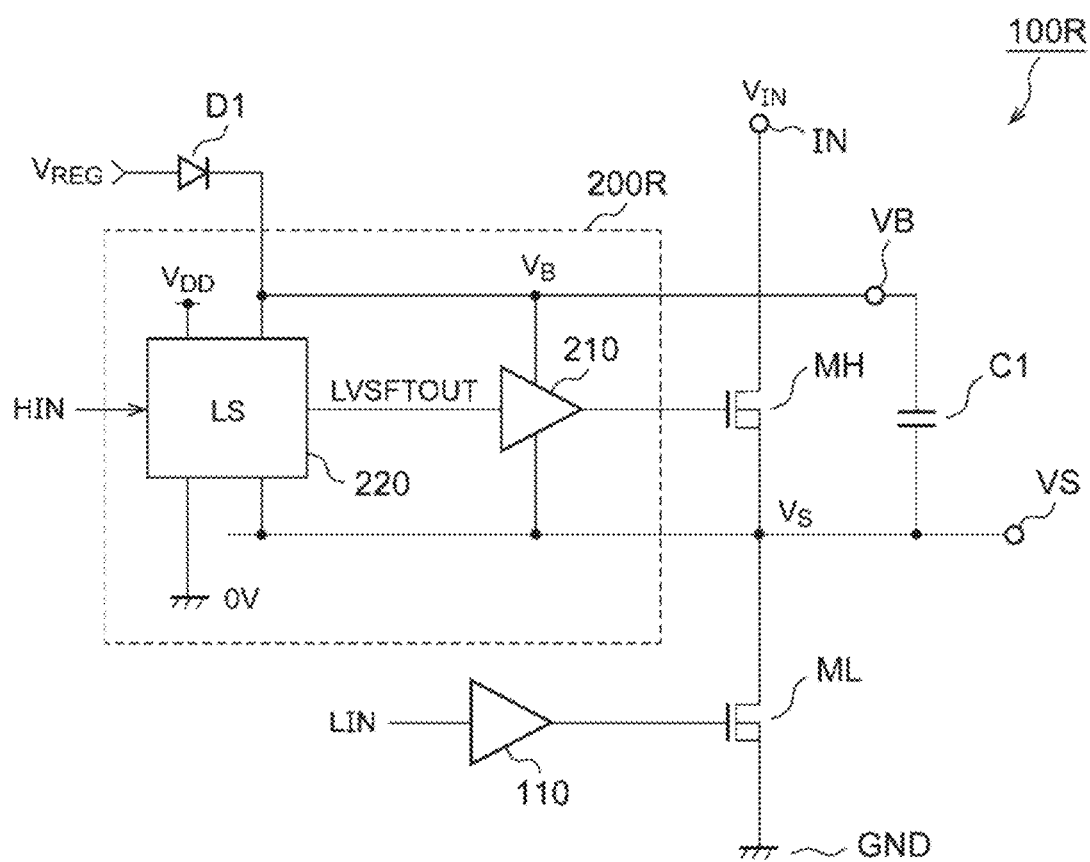
FIG. 1 is a circuit diagram of a switching circuit.

A summary of several illustrative embodiments of the present disclosure is given below. The summary serves as the preamble of the detailed description to be given shortly, and aims to provide fundamental understanding of the embodiments by describing several concepts of one or more embodiments in brief. It should be noted that the summary is not to be construed as limitations to the scope of the present disclosure. Moreover, the summary does not necessarily encompass all embodiments that can be taken into account, and does provide definitions for essential constituent elements of the embodiments. For the sake of better description, "one embodiment" sometimes refers to one embodiment (an implementation example or a variation example) or multiple embodiments (implementation examples or variation examples) disclosed in this specification.

According to one embodiment, a drive circuit, which is used to drive an N-channel or an NPN type high-side transistor, includes: a level shift circuit, level-shifting an input signal to a signal that sets a voltage of a high-side power supply line to a high level and a voltage of a high-side ground line to a low level; and a buffer, driving the high-side transistor according to an output of the level shift circuit. The level shift circuit includes: a pulse generator, generating a first pulse that becomes high level for a certain period of time in response to a first edge of the input signal and a second pulse that becomes high level for a certain period of time in response to a second edge of the input signal; an open drain circuit, in which a first output node becomes low level in response to the first pulse and a second output node becomes low level in response to the second pulse; a first current mirror circuit, having an input node connected to the first output node of the open drain circuit, and folding back a first current flowing through the first output node of the open drain circuit; a second current mirror circuit, having an input node connected to the second output node of the open drain circuit, and folding back a second current flowing through the second output node of the open drain circuit; and a first latch circuit, of which a state is changed in response to a third current that is an output of the first current mirror circuit, and a fourth current that is an output of the second current mirror circuit.

In the configuration above, a pulse signal is generated according to an edge of an input signal, and the state of a latch is changed according to the pulse signal. Thus, a stable-state current does not flow and current consumption can be accordingly reduced.

In one embodiment, the open drain circuit may include: a first transistor, which is a high breakdown voltage element, having a gate receiving the first pulse and a drain connected to the first output node; and a second transistor, which is a high breakdown voltage element, having a gate receiving the second pulse and a drain connected to the second output node. In the configuration above, the first transistor and the second transistor are high breakdown voltage elements while the rest may be low breakdown voltage elements, so that the chip area can be reduced.

In one embodiment, the open drain circuit may further include: a third transistor, disposed between a source and a ground of the first transistor, and having a gate biased by constant voltage; and a fourth transistor, disposed between a source and a ground of the second transistor, and having a gate biased by constant voltage. In the configuration above, current amounts of the first current and the second current can be specified according to sizes of the third transistor and the fourth transistor, so that current amounts of the third current and the fourth current can be further specified. In other words, given that the state of the first latch circuit is reliably changed, the first current and the second current can be designed as being minimal, thereby reducing the circuit current.

In one embodiment, the first latch circuit may include a cross-coupled first inverter and a cross-coupled second inverter. Alternatively, the third transistor and the fourth transistor may have the same or a larger size as/than the low-side transistors of the first inverter and the second inverter, respectively. Accordingly, the state of the first latch circuit can be reliably changed.

In one embodiment, the drive circuit may further include an auxiliary circuit. The auxiliary circuit supplies a first auxiliary current to the drain of the first transistor and a second auxiliary current to the drain of the second transistor in response to an increase in the voltage of the high-side power supply line. Accordingly, the third current and the fourth current induced when the voltage of the high-side power supply line increases can be reduced, thereby preventing malfunction of the first latch circuit.

In one embodiment, the auxiliary circuit may include a capacitive element, and an impedance circuit disposed between the capacitive element and the high-side power supply line, wherein the first auxiliary current and the second auxiliary current are generated according to a voltage drop of the impedance circuit. The capacitive element may detect a voltage increase in the high-side power supply line.

In one embodiment, the capacitive element may include a fifth transistor. The fifth transistor is a high breakdown voltage element of the same type as the first transistor and the second transistor, and has a gate and a source connected to each other. With the parasitic capacitance of the fifth transistor, which is a replica of the parasitic capacitance of the first transistor and the second transistor, auxiliary currents can be generated corresponding to the delay in the fluctuation of the drain voltages of the first transistor and the second transistor.

In one embodiment, the auxiliary circuit may further include: a sixth transistor, disposed between the high-side power supply line and the drain of the first transistor, and receiving the voltage drop of the impedance circuit between a gate and a source of the sixth transistor; and a seventh transistor, disposed between the high-side power supply line and the drain of the second transistor, and receiving the voltage drop of the impedance circuit between a gate and a source of the seventh transistor.

In one embodiment, the drive circuit further includes a second latch circuit that latches an output of the first latch circuit.

In one embodiment, the second latch circuit includes: a third inverter, receiving a first output of the first latch circuit; a fourth inverter, receiving a second output of the first latch circuit; an eighth transistor, disposed between the third inverter and the high-side ground line, and having a gate connected to an output node of the fourth inverter; and a ninth transistor, disposed between the fourth inverter and the high-side ground line, and having a gate connected to an output node of the third inverter.

In one embodiment, a drive circuit is used to drive an N-channel or an NPN type high-side transistor. The drive circuit includes: a pulse generator, generating a first pulse that becomes high level for a certain period of time in response to a first edge of an input signal and a second pulse that becomes high level for a certain period of time in response to a second edge of the input signal; a first transistor, being a high breakdown voltage element, and having a gate that receives the first pulse; a second transistor, being a high breakdown voltage element, and having a gate that receives the second pulse; a third transistor, disposed between a source and a ground of the first transistor, and having a gate biased by constant voltage; a fourth transistor, disposed between a source and a ground of the second transistor, and having a gate biased by constant voltage; a first current mirror circuit, connected to a high-side power supply line and having an input node connected to a drain of the first transistor; a second current mirror circuit, connected to the high-side power supply line and having an input node connected to a drain of the second transistor; a first inverter, disposed between the high-side power supply line and a high-side ground line, and having an input node connected to an output node of the first current mirror circuit; and a second inverter, disposed between the high-side power supply line and the high-side ground line, having an input node connected to an output node of the second current mirror circuit and an output node of the first inverter, and having an output node connected to an input node of the first inverter.

In one embodiment, the drive circuit may further include: a fifth transistor, which is a high breakdown voltage element and has a gate and a grounded source; an impedance element, disposed between a drain of the fifth transistor and the high-side power supply line; a sixth transistor, disposed between the high-side power supply line and the drain of the first transistor, and having a gate connected to a node on a low potential side of the impedance element; and a seventh transistor, disposed between the high-side power supply line and the drain of the second transistor, and having a gate connected to the node on the low potential side of the impedance element.

In one embodiment, the drive circuit may be integrated in a semiconductor substrate. The so-called "integrated" includes a situation in which all constituting elements of a circuit are formed on a semiconductor substrate, and a situation in which main constituting elements of a circuit are integrated. In order to adjust circuit constants, a part of resistors or capacitors may be arranged outside the semiconductor substrate. By integrating circuits on one chip, the circuit area is reduced and characteristics of circuit elements are kept uniform.

Embodiments

Details of the embodiments are given with the accompanying drawings below. The same or equivalent constituting elements, parts and processes in the accompanying drawings are represented by the same denotations, and repeated description is omitted as appropriate. Moreover, the embodiments are illustrative and are non-limiting to the present disclosure. All features and combinations thereof described in the embodiments are not necessarily intrinsic characteristics of the present disclosure.

In this specification, an expression "a state of component A connected to component B" includes, in addition to a situation where component A and component B are directly connected, a situation where component A is indirectly connected to component B via another component, and the indirect connection does not result in substantial influences on their electrical connection or does not impair functions or effects exerted by their connection.

Similarly, an expression "a state of component C disposed between component A and component B" includes, in addition to a situation where component A and component C, or component B and component C are directly connected, an indirect connection via another component, and the indirect connection does not result in substantial influences on their electrical connection or does not impair functions or effects exerted by their connection.

Moreover, the so-called "signal A (voltage or current) corresponds to signal B (voltage or current) means that signal A is associated with signal B, and specifically means that (i) signal A is signal B, (ii) signal A is proportional to signal B, (iii) signal A is obtained by level shifting signal B, (iv) signal A is obtained by amplifying signal B, (v) signal A is obtained by inverting signal B, and (vi) any combination of the above. It should be understood by the skilled person in the art that the range of "corresponding to" is determined according to the types and use of signals A and B.

First Embodiment

Figure 2:
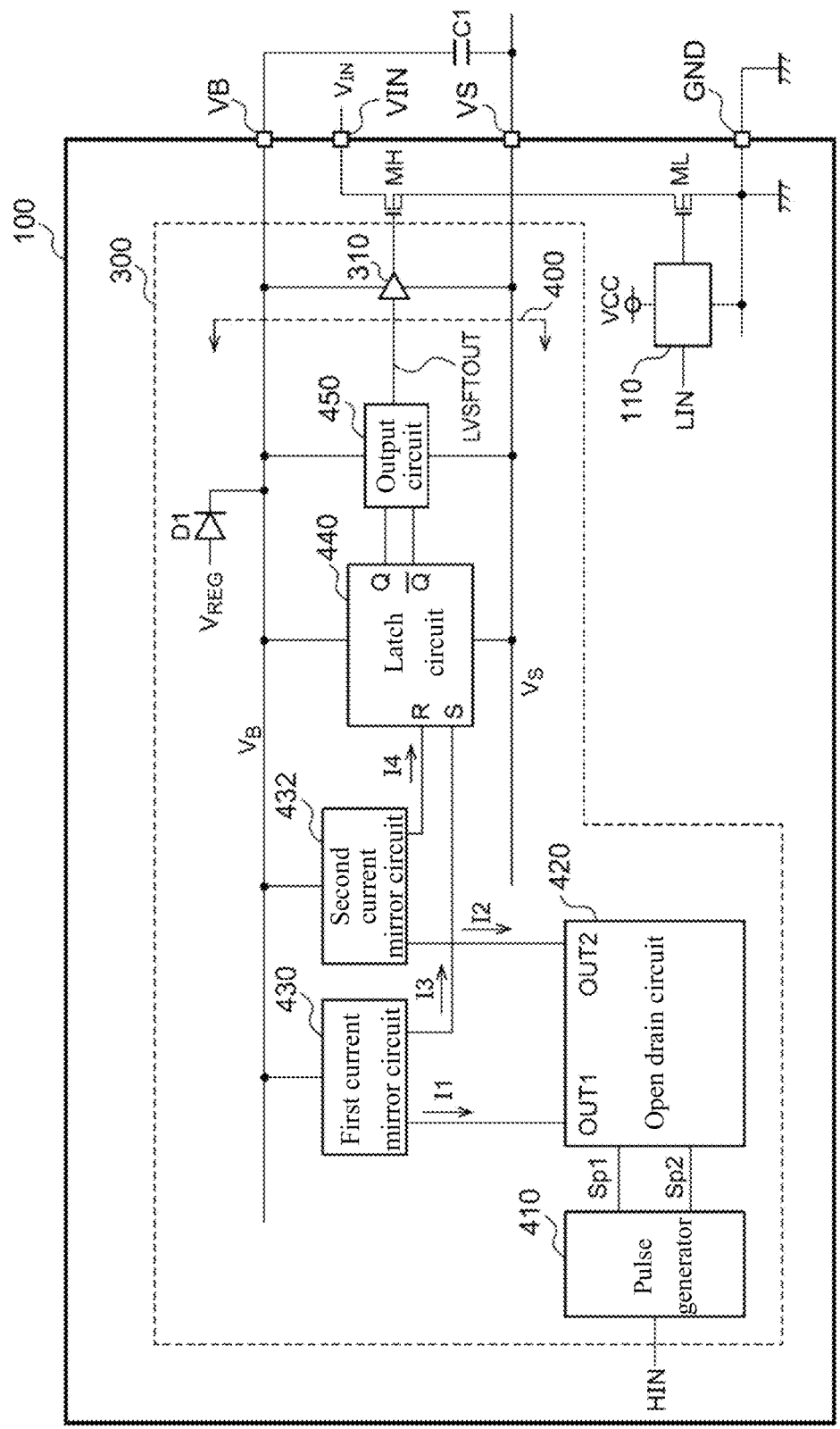
FIG. 2 is a circuit diagram of a switching circuit according to a first embodiment.

FIG. 2 shows a circuit diagram of a switching circuit 100 according to a first embodiment. The switching circuit 100 includes an input pin VIN, a bootstrap pin VB, a switching pin VS and a ground pin GND. In the description below, a pin is also referred to as a terminal or a line.

The switching circuit 100 is an integrated circuit (IC), which includes a high-side transistor MH, a low-side transistor ML, a high-side drive circuit 300 and a low-side drive circuit 110 that are integrated as a semiconductor chip.

The high-side transistor MH is an N-channel or NPN type transistor, and is disposed between the pin VIN and the pin VS. The low-side transistor ML is of the same type as the high-side transistor MH, and is disposed between the pin VS and the pin GND. Similar to FIG. 1, the switching circuit 100 generates a high-level voltage $V_B$ higher than an input voltage $V_{IN}$ at the high-side power supply line (bootstrap line) VB by means of a so-called bootstrap circuit. An internal voltage $V_{REG}$ generated by a regulator circuit (not shown) is applied to the bootstrap line VB via a diode D1. When an external power supply provides a stable DC voltage at an appropriate voltage level, the regulator circuit can be omitted.

The low-side drive circuit 110 drives the low-side transistor ML according to a control signal LIN.

The high-side drive circuit 300 drives the high-side transistor MH according to a control signal HIN. The high-side drive circuit (also to be referred to as a drive circuit below) 300 includes a buffer (a driver) 310 and a level shift circuit 400.

The level shift circuit 400 converts the input signal HIN at a logic level that sets the voltage of the pin GND to be low level and the power supply voltage $V_{CC}$ to be high level to an intermediate signal LVSFTOUT that sets the voltage $V_B$ of the bootstrap line VB to high level and the voltage $V_S$ of the switch line VS to be low level. The buffer 310 drives the high-side transistor MH according to the output LVSFTOUT of the level shift circuit 400.

The level shift circuit 400 includes a pulse generator 410, an open drain circuit 420, a first current mirror circuit 430, a second current mirror circuit 432, a first latch circuit 440 and an output circuit 450.

The pulse generator 410 generates a first pulse Sp1 that becomes high level for a certain period of time in response to a first edge (for example, a positive edge) of the input signal HIN and a second pulse Sp2 that becomes high level for a certain period of time in response to a second edge (for example, a negative edge) of the input signal HIN.

The open drain circuit 420 has a first output node OUT1 and a second output node OUT2. In the open drain circuit 420, the first output node OUT1 becomes low level in response to the first pulse Sp1 asserted (high) and the second output node OUT2 becomes low level in response to the second pulse Sp2 asserted (high).

The first current mirror circuit 430 and the second current mirror circuit 432 are connected to the bootstrap line VB. The first current mirror circuit 430 has an input node IN connected to the first output node OUT1 of the open drain circuit 420, and the first current mirror circuit 430 folds back a first current I1 flowing through the first output node OUT1 of the open drain circuit 420. An output current of the first current mirror circuit 430 is referred to as a third current I3.

The second current mirror circuit 432 has an input node IN connected to the second output node OUT2 of the open drain circuit 420, and the second current mirror circuit 432 folds back a second current I2 flowing through the second output node OUT2 of the open drain circuit 420. An output current of the second current mirror circuit 432 is referred to as a fourth current I4.

The first latch circuit 440 is disposed between the bootstrap line VB and the switch line VS. The first latch circuit 440 has a state that is changed in response to the third current I3 from the first current mirror circuit 430, and the fourth current I4 from the second current mirror circuit 432. More specifically, if the third current I3 is supplied, the first latch circuit 440 changes to a first state (Q=H); if the fourth current I4 is supplied, the first latch circuit 440 changes to a second state (Q=L).

An output of the level shift circuit 440 outputs the signal LVSFTOUT corresponding to the state of the first latch circuit 440. The output circuit 450 including such as a flip-flop or a buffer may also be disposed at the back end of the first latch circuit 440. When an input impedance of the buffer 310 is sufficiently high, the output circuit 450 may also be omitted.

Figure 3:
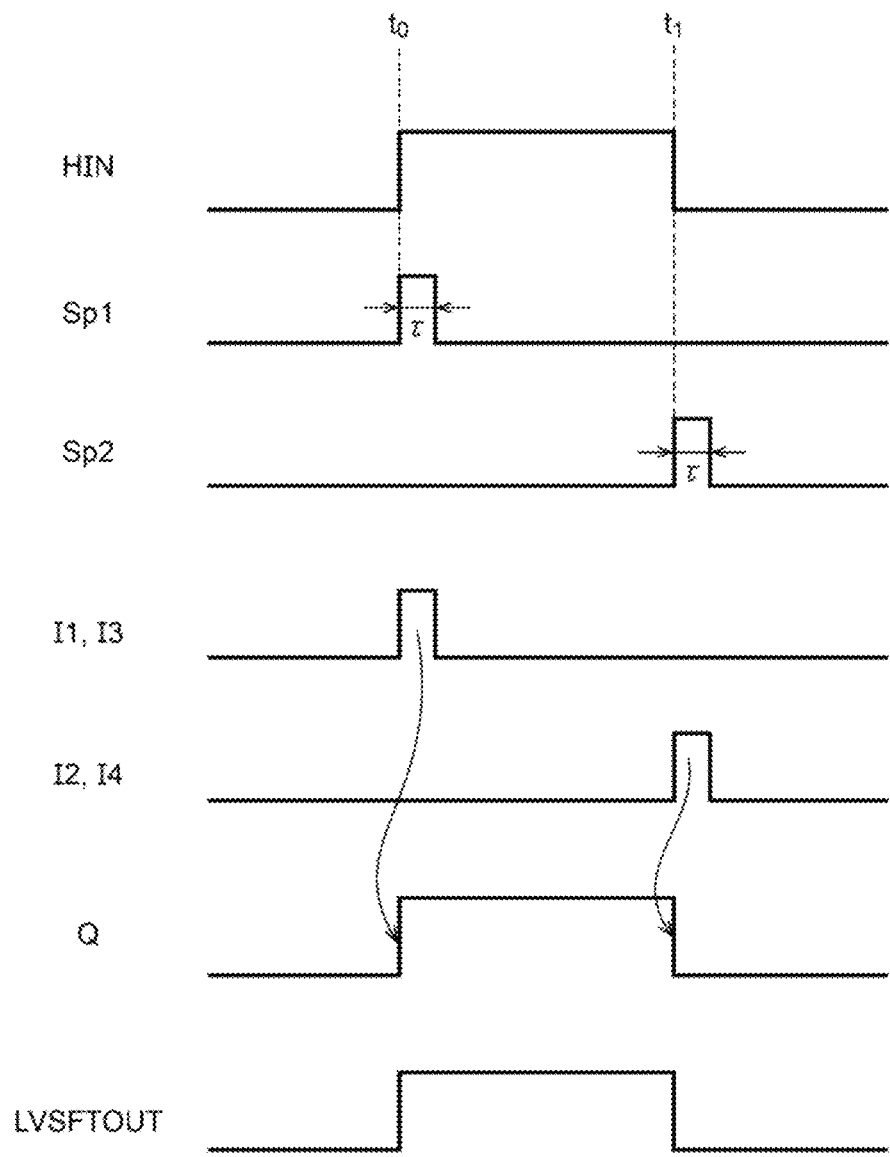
FIG. 3 is a waveform diagram of the operation of the switching circuit in FIG. 2.

The configuration of the switching circuit 100 is as described above. The operation of the switching circuit 100 is to be described below. FIG. 3 shows a waveform diagram of the operation of the switching circuit 100 in FIG. 2.

Before a timing $t_0$, the input signal HIN is low, the first latch circuit 440 is in the second state (Q=L), and the output LVSFTOUT of the level shift circuit 400 is also low (=$V_S$).

At the timing $t_0$, if the input signal HIN is changed to high, the pulse generator 410 outputs the first pulse Sp1 that becomes high level for a certain period of time τ. In response to the first pulse Sp1, the first current I1 flows through the first output node OUT1 of the open drain circuit 420, and the first current mirror circuit 430 folds back the current and inputs the third current I3 to the first latch circuit 440. Accordingly, the first latch circuit 440 is changed to the first state (Q=H). As a result, the output LVSFTOUT of the level shift circuit 400 is also changed to high.

At a timing $t_1$, if the input signal HIN is changed to low, the pulse generator 410 outputs the second pulse Sp2 that becomes high level for the certain period of time τ. In response to the second pulse Sp2, the second current I2 flows through the second output node OUT2 of the open drain circuit 420, and the second current mirror circuit 432 folds back the current and inputs the fourth current I4 to the first latch circuit 440. Accordingly, the first latch circuit 440 is changed to the second state (Q=L). As a result, the output LVSFTOUT of the level shift circuit 400 is changed to low.

The operation of the switching circuit 100 is as described above. According to the switching circuit 100, the pulses signals Sp1 and Sp2 are generated based on the edges of the input signal HIN, and the third current I3 and the fourth current I4 in intermittent pulses are supplied to the first latch circuit 440 based on the pulse signals Sp1 and Sp2, so that the state of the first latch circuit 440 is changed. No stable-state current flows after the state of the first latch circuit 440 is determined, and so current consumption can be reduced.

Moreover, the currents I3 and I4 supplied to the first latch circuit 440 may be designed according to output impedances of the open drain circuit 420 (that is, current amounts of the currents I1 and I2) and a mirror ratio of the first current mirror circuit 430 and the second current mirror circuit 432 (a current amplification ratio). Thus, current amounts of the pulse currents I3 and I4 can be specified by means of reliably changing the state of the first latch circuit 440, thereby achieving a stable circuit operation.

Figure 4:
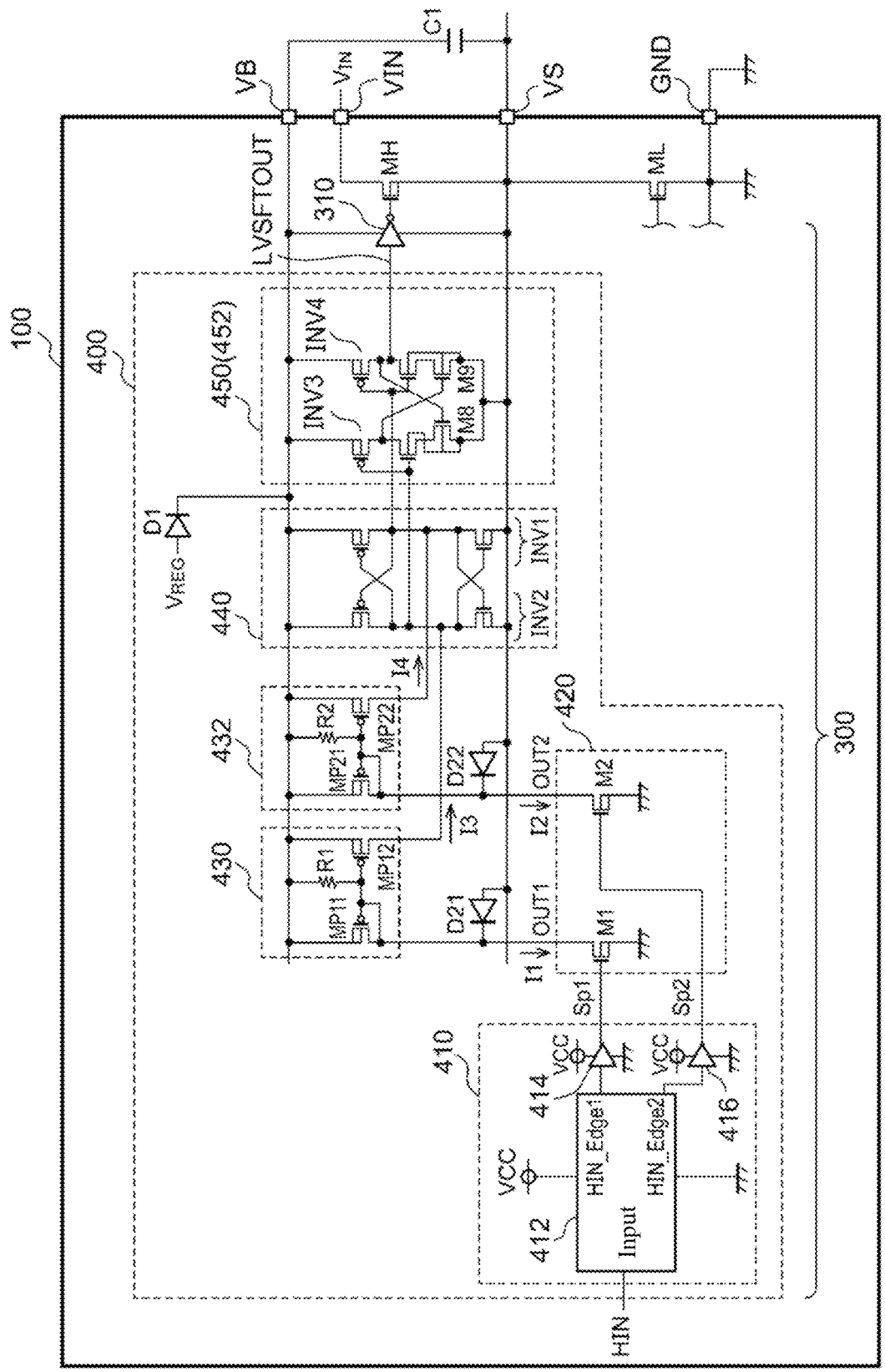
FIG. 4 is a circuit diagram of a configuration example of the switching circuit in FIG. 2.

A specific configuration example of the level shift circuit 400 is to be described below. FIG. 4 shows a circuit diagram of a configuration example of the switching circuit 100 in FIG. 2.

The configuration of the pulse generator 410 is not specifically defined, and may include, for example, an edge detection circuit 412 and buffers 414 and 416. The edge detection circuit 412 generates an edge detection signal HIN_Edge1 that becomes high level for a certain period of time in response to a first edge of the input signal HIN and an edge detection signal HIN_Edge2 that becomes high level for a certain period of time in response to a second edge of the input signal HIN. The edge detection circuit 412 may be implemented by known techniques, and may be formed by, for example, a combination of a delay circuit and a logic gate. Those two edge detection signals HIN_Edge1 and HIN_Edge2 are output via the buffers 414 and 416.

The open drain circuit 420 includes a first transistor M1 and a second transistor M2. The first transistor M1 and the second transistor M2 are high breakdown voltage elements. A high breakdown voltage element is appropriately implemented by a transistor having a double-diffused MOS (DMOS) structure, or may be implemented by a transistor of other structures, for example, a high voltage MOSFET (HVMOS), a lateral diffusion MOSFET (LDMOS), an insulated gate bipolar transistor (IGBT), a silicon carbide (SiC) junction field-effect transistor (JFET), and a SiC-MOSFET. Other transistors not specifically specified as high breakdown voltage elements are MOSFETs having a usual breakdown voltage.

The first transistor M1 has a gate input with the first pulse Sp1, a source grounded, and a drain being the first output node OUT1 of the open drain circuit 420. The second transistor M2 has a gate input with the second pulse Sp2, a source grounded, and a drain being the second output node OUT2 of the open drain circuit 420.

The gate of the first transistor M1 is input with the first pulse Sp1 and the source thereof is grounded. The gate of the second transistor M2 is input with the second pulse Sp2 and the source thereof is grounded.

The first current mirror circuit 430 is formed by paired PMOS transistors MP11 and MP12 of which gates are commonly connected. A resistor R1 may also be disposed between gates and sources of the PMOS transistors MP11 and MP12.

The second current mirror circuit 432 is formed by paired PMOS transistors MP21 and MP22 of which gates are commonly connected. A resistor R2 may also be disposed between gates and sources of the PMOS transistors MP21 and MP22.

A first diode D21 is disposed between an input node of the first current mirror circuit 430, that is, between the drain of the PMOS transistor MP11 and the switch line VS. A potential of the input node of the first current mirror circuit 430 can be clamped by the first diode D21 with $V_S-Vf$ as its lower limit, thus preventing an overvoltage from being applied to the first current mirror circuit 430. Similarly, a second diode D22 is disposed between an input node of the second current mirror circuit 432, that is, between the drain of the PMOS transistor MP21 and the switch line VS. A potential of the input node of the second current mirror circuit 432 can be clamped by the second diode D22 with $V_S-Vf$ as its lower limit, thus preventing an overvoltage from being applied to the second current mirror circuit 432.

The first latch circuit 440 includes a cross-coupled first inverter INV1 and a cross-coupled second inverter INV2. More specifically, an input node of the first inverter INV1 and an output node of the second inverter INV2 are connected, and an output node of the first inverter INV1 is connected to an input node of the second inverter INV2.

The first inverter INV1 further has its input node connected to an output node of the first current mirror circuit 430. If the third current I3 flows, the input node of the first inverter INV1 becomes high level, such that the output node of the first inverter INV1 changes to low level. Since the output node of the first inverter INV1 is connected to the input node of the second inverter INV2, the output node of the second inverter INV2 performs feedback in a manner of becoming high level. Accordingly, the first latch circuit 440 is latched in the first state.

The second inverter INV2 further has its input node connected to an output node of the second current mirror circuit 432. If the fourth current I4 flows, the input node of the second inverter INV2 becomes high level, such that the output node of the second inverter INV2 changes to low level. Since the output node of the second inverter INV2 is connected to the input node of the first inverter INV1, the output node of the first inverter INV1 performs feedback in a manner of becoming low level. Accordingly, the first latch circuit 440 is latched in the second state.

In this example, the output circuit 450 includes a second latch circuit 452. The second latch circuit 452 includes a third inverter INV3, a fourth inverter INV4, an eighth transistor M8 and a ninth transistor M9. The third inverter INV3 receives a first output (for example, a non-inverted output) Q of the first latch circuit 440. The fourth inverter INV4 receives a second output (for example, an inverted output) QB of the first latch circuit 440. The eighth transistor M8 is disposed between the third inverter INV3 and the switch line VS, and has a gate connected to an output node of the fourth inverter INV4. The ninth transistor M9 is disposed between the fourth inverter INV4 and the switch line VS, and has a gate connected to an output node of the third inverter INV3.

By inserting the second latch circuit 452 at the back end of the first latch circuit 440, on and off states of the high-side transistor MH can be reliably controlled.

The buffer 310 inverts the output LVSFTOUT of the level shift circuit 400 and applies the inverted output to the gate of the high-side transistor MH.

Second Embodiment

Figure 5:
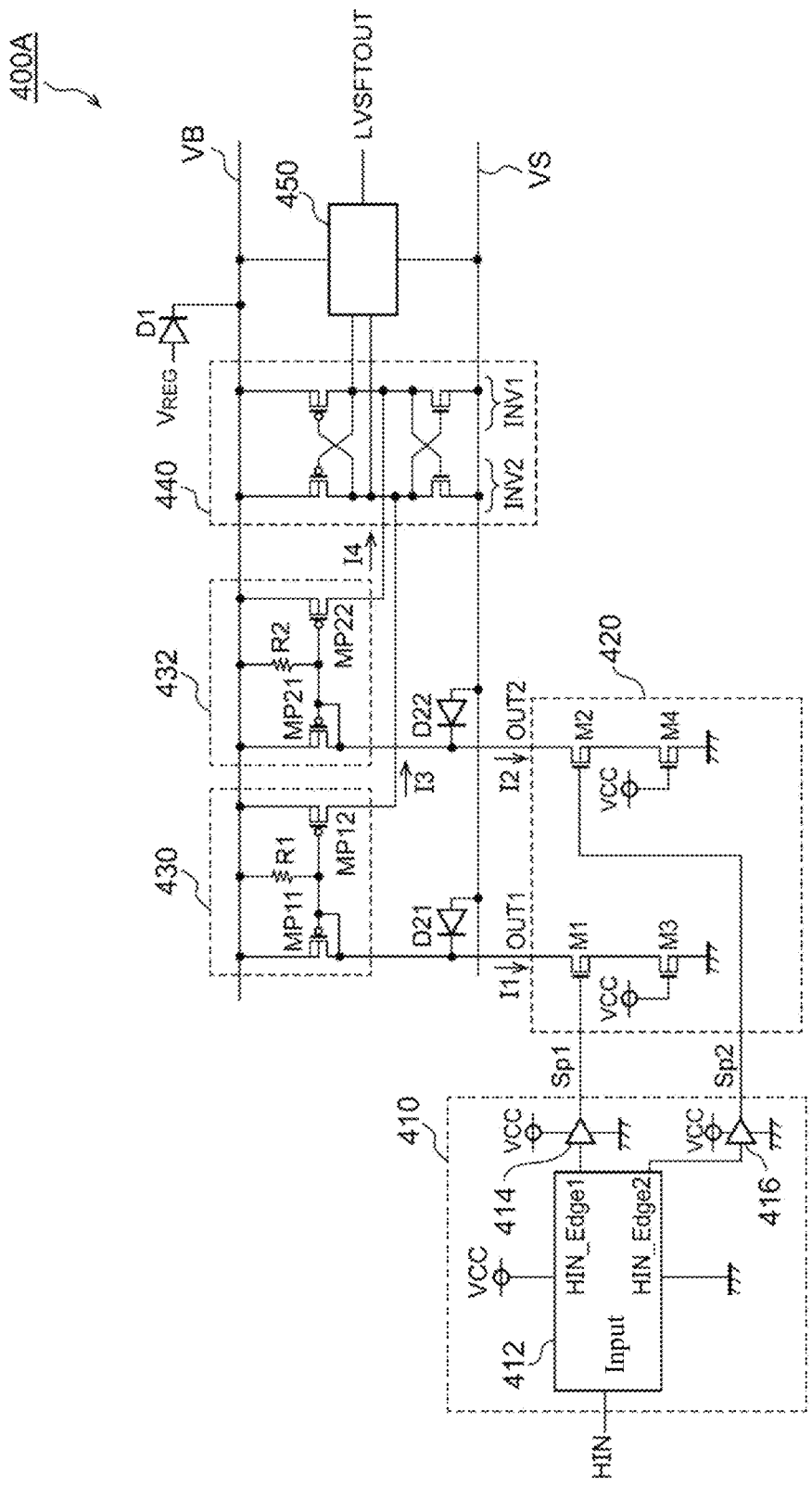
FIG. 5 is a circuit diagram of a level shift circuit according to a second embodiment.

FIG. 5 shows a circuit diagram of a level shift circuit 400A according to a second embodiment. In addition to the first transistor M1 and the second transistor M2, the open drain circuit 420 further includes a third transistor M3 and a fourth transistor M4.

The third transistor M3 is an NMOS transistor, and is disposed between the source and the ground of the first transistor M1. The fourth transistor M4 is an NMOS transistor, and is disposed between the source and the ground of the second transistor M2. The third transistor M3 and the fourth transistor M4 have gates biased by a constant voltage (for example, a power supply voltage Vcc), respectively.

Blocks other than the open drain circuit 420 may be configured similarly to those of FIG. 4.

In the configuration above, an impedance of a path of the first current I1 and an impedance of a path of the second current I2 can be determined according to sizes of the third transistor M3 and the fourth transistor M4, so that current amounts of the first current I1 and the second current I2 can be specified, further being able to specify current amounts of the third current I3 and the fourth current I4. In other words, given that the state of the first latch circuit 440 is reliably changed, the first current I1 and the second current I2 can be designed as being minimal, thereby reducing the circuit current.

Alternatively, a transfer ratio (I3/I1) of the first current mirror circuit 430 and a transfer ratio (I4/I2) of the second current mirror circuit 432 may be respectively designed to be 1. In this case, sizes of the third transistor M3 and the fourth transistor M4 may have the same or a larger size as/than the low-side NMOS transistors of the first inverter INV1 and the second inverter INV2, respectively. Accordingly, the state of the first latch circuit 440 can be reliably changed by means of the third current I3 and the fourth current I4.

Third Embodiment

Figure 6:
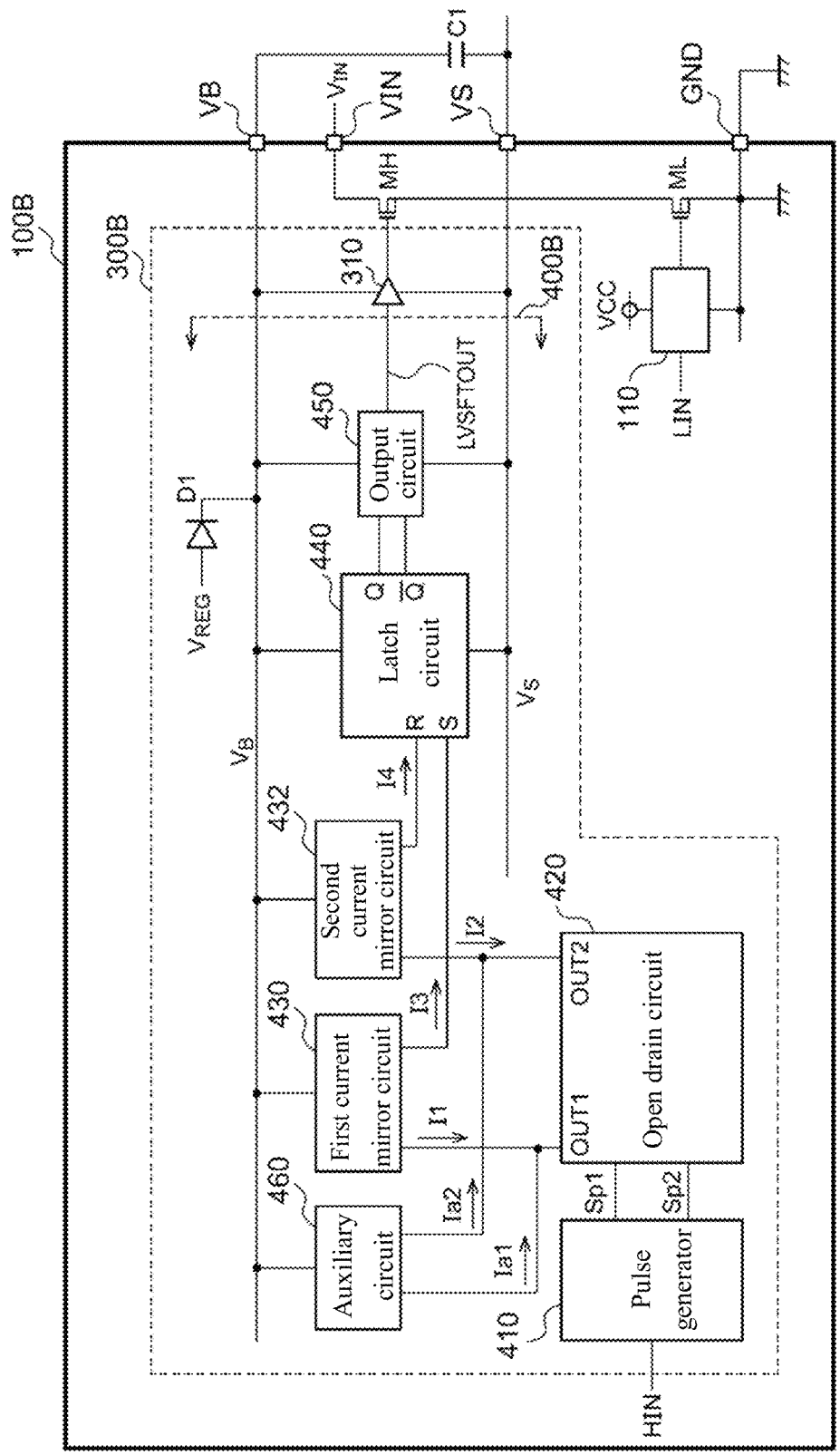
FIG. 6 is a circuit diagram of a switching circuit according to a third embodiment.

FIG. 6 shows a circuit diagram of a switching circuit 100B according to a third embodiment. In addition to the level shift circuit 400 in FIG. 2, a level shift circuit 400B of a drive circuit 300B further includes an auxiliary circuit 460.

When the first transistor M1 and the second transistor M2 are formed by high breakdown voltage elements such as DMOS transistors, parasitic capacitances Cp1 and Cp2 may be present between the drain and the ground of the first transistor M1, and between the drain and the ground of the second transistor M2. These parasitic capacitances Cp1 and Cp2 pose undesirable effects on the state of the first latch circuit 440.

More specifically, the drain voltages of the first transistor M1 and the second transistor M2 also increase as the voltage $V_B$ of the bootstrap line VB increases; however, a delay in the increase may occur if the parasitic capacitances Cp1 and Cp2 are large. As such, in order to increase the voltage of the parasitic capacitance Cp1, the first current I1 flows in from the first current mirror circuit 430, and the third current I3 is induced. Moreover, in order to increase the voltage of the parasitic capacitance Cp2, the second current I2 flows in from the second current mirror circuit 432, and the fourth current I4 is induced. In case of imbalance between the third current I3 and the fourth current I4, malfunction of the first latch circuit 440 may be resulted.

The auxiliary circuit 460 is disposed for mitigating the influences of the parasitic capacitances Cp1 and Cp2. The auxiliary circuit 460 supplies a first auxiliary current Ia1 to the drain of the first transistor M1, that is, the parasitic capacitance Cp1, and a second auxiliary current Ia2 to the drain of the second transistor M2, that is, the parasitic capacitance Cp2, in response to an increase in the voltage $V_B$ of the bootstrap line VB (the high-side power supply line).

The operation of the drive circuit 300B is to be described below. If the voltage $V_B$ of the bootstrap line VB (the high-side power supply line) increases, the auxiliary circuit 460 generates the first auxiliary current Ia1 and the second auxiliary current Ia2.

The first auxiliary current Ia1 is supplied along with the first current I1 flowing through the input node of the first current mirror circuit 430 to the parasitic capacitance Cp1 of the first transistor M1, so that the drain voltage of the first transistor M1 increases. That is, compared to a situation where the first auxiliary current Ia1 is absent, the first current I1 flowing in the first current mirror circuit 430 is substantially reduced by an amount of the first auxiliary current Ia1. Thus, the third current I3 can be reduced.

Similarly, the second auxiliary current Ia2 is supplied along with the second current I2 flowing through the input node of the second current mirror circuit 432 to the parasitic capacitance Cp2 of the second transistor M2, so that the drain voltage of the second transistor M2 increases. That is, compared to a situation where the second auxiliary current Ia2 is absent, the second current I2 flowing in the second current mirror circuit 432 is substantially reduced by an amount of the second auxiliary current Ia2. Thus, the fourth current I4 can be reduced.

As such, by adding the auxiliary circuit 460, while the voltage $V_B$ of the bootstrap line VB increases, the currents I3 and I4 supplied to the first latch circuit 440 are reduced, thereby preventing malfunction of the first latch circuit 440.

Figure 7:
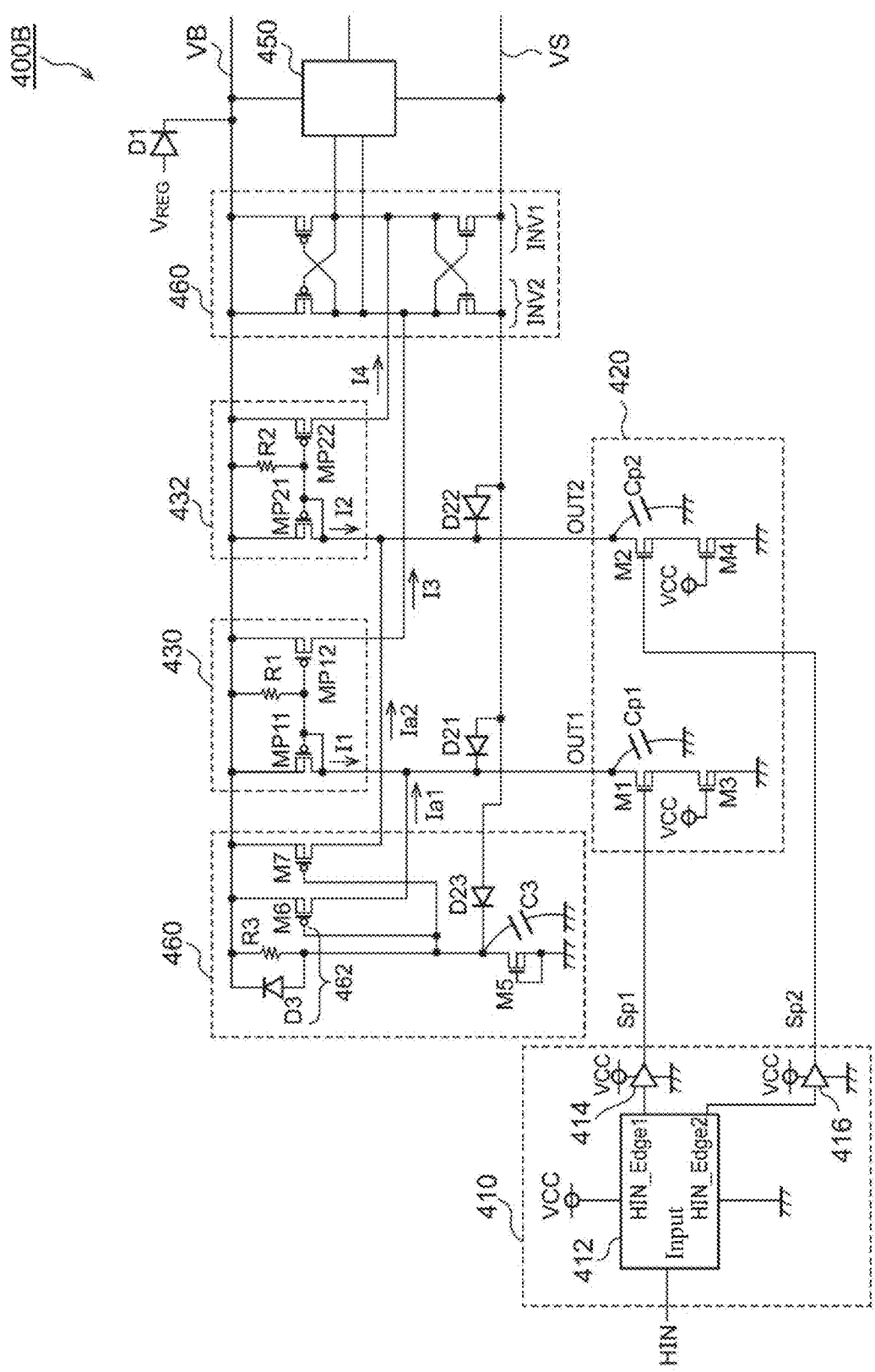
FIG. 7 is a circuit diagram of a specific configuration example of the level shift circuit in FIG. 6.

FIG. 7 shows a circuit diagram of a specific configuration example of the level shift circuit 400B in FIG. 6.

The auxiliary circuit 460 includes a capacitive element C3, an impedance circuit 462, a sixth transistor M6 and a seventh transistor M7. The impedance circuit 462 and the capacitive element C3 are connected in series between the bootstrap line (the high-side power supply line) VB and the low-side ground.

The capacitive element C3 may be formed by a parasitic capacitance of a fifth transistor M5, which is a high breakdown voltage element of the same type as the first transistor M1 and the second transistor M2. The fifth transistor M5 has a gate and a source connected to each other, and is accordingly fixed in an off state.

When the voltage $V_B$ of the bootstrap line VB increases, the voltage (that is, a drain voltage of the fifth transistor M5) of the capacitive element C3 fluctuates after a delay, and a voltage between two terminals (a voltage drop) of the impedance circuit 462 increases.

The auxiliary circuit 460 generates the first auxiliary current Ia1 and the second auxiliary current Ia2 according to the voltage drop of the impedance circuit 462. However, the present disclosure is not limited to the example above, and the impedance circuit 462 may include a resistor R3 and a diode D3. The diode D3 may also be omitted, and a transistor with an appropriate bias may be used in substitution for the resistor R3.

The sixth transistor M6 is a P-channel MOSFET, which is disposed between the bootstrap line VB and the drain of the first transistor M1, and receives the voltage drop of the impedance circuit 462 between its gate and source. The seventh transistor M7 is a P-channel MOSFET, which is disposed between the bootstrap line VB and the drain of the second transistor M2, and receives the voltage drop of the impedance circuit 462 between its gate and source.

The operation of the auxiliary circuit 460 is to be described with reference to FIG. 7 below. The fifth transistor M5 is a high breakdown voltage element the same as the first transistor M1 and the second transistor M2, and a parasitic capacitance C3 thereof becomes a replica of the parasitic capacitances Cp1 and Cp2. If the voltage $V_B$ of the bootstrap line VB increases drastically, after the fluctuation of the drain voltage of the fifth transistor M5 is delayed because of the parasitic capacitance C3, a greater voltage drop is generated at the impedance circuit 462 (the resistor R3), and the voltages between the gates and sources of the sixth transistor M6 and the seventh transistor M7 are increased. Accordingly, the auxiliary currents Ia1 and Ia2 flow through the sixth transistor M6 and the seventh transistor M7.

The configurations of the third transistor M3 and the fourth transistor M4 are omitted from FIG. 7, and the auxiliary circuit 460 is added to the configuration in FIG. 4 to form an aspect of the present disclosure.

(Use)

Figure 8:
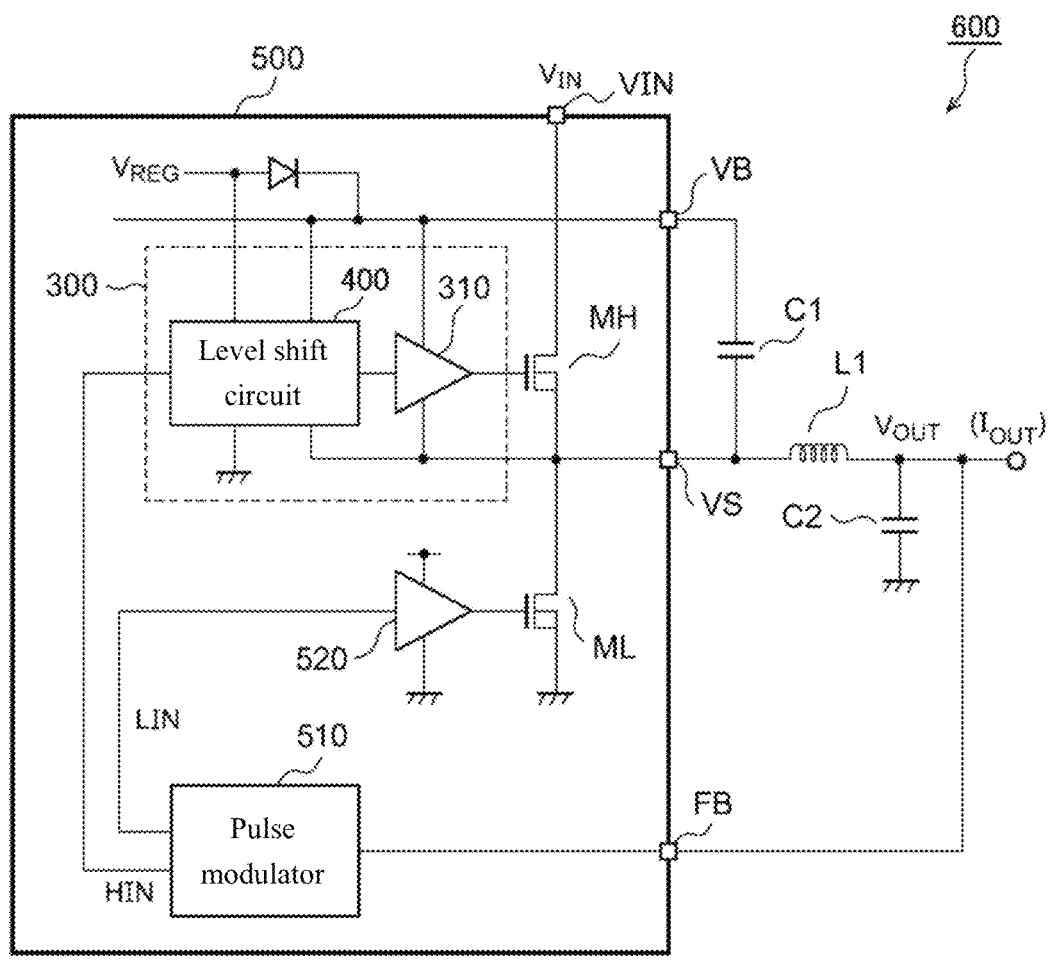
FIG. 8 is a circuit diagram of a controller of a DC/DC converter.

Next, the use of the drive circuit 300 is to be described below. The drive circuit 300 may be used in a DC/DC converter. FIG. 8 shows a circuit diagram of a controller 500 of a DC/DC converter 600. The DC/DC converter 600 is a synchronous rectification type buck converter, and further includes capacitors C1 and C2 and an inductor L1 in addition to the controller 500.

The controller 500 includes a high-side transistor MH, a low-side transistor ML, a pulse modulator 510, a low-side drive circuit 520 and a drive circuit (a high-side drive circuit) 300. The pulse modulator 510 generates pulse signals HIN and LIN in a manner that an output (an output voltage, an output current or a state of a load) of the DC/DC converter 600 approximates a target. For example, the pulse modulator 510 may cause an output voltage $V_{OUT}$ to approximate a target voltage $V_{REF}$ (constant voltage control) or an output current $I_{OUT}$ to approximate a target current $I_{REF}$ (constant current control).

The high-side drive circuit 300 drives the N-channel or NPN type high-side transistor MH according to the pulse signal HIN. Moreover, the low-side drive circuit 520 drives the low-side transistor ML according to the pulse signal LIN.

Figure 9:
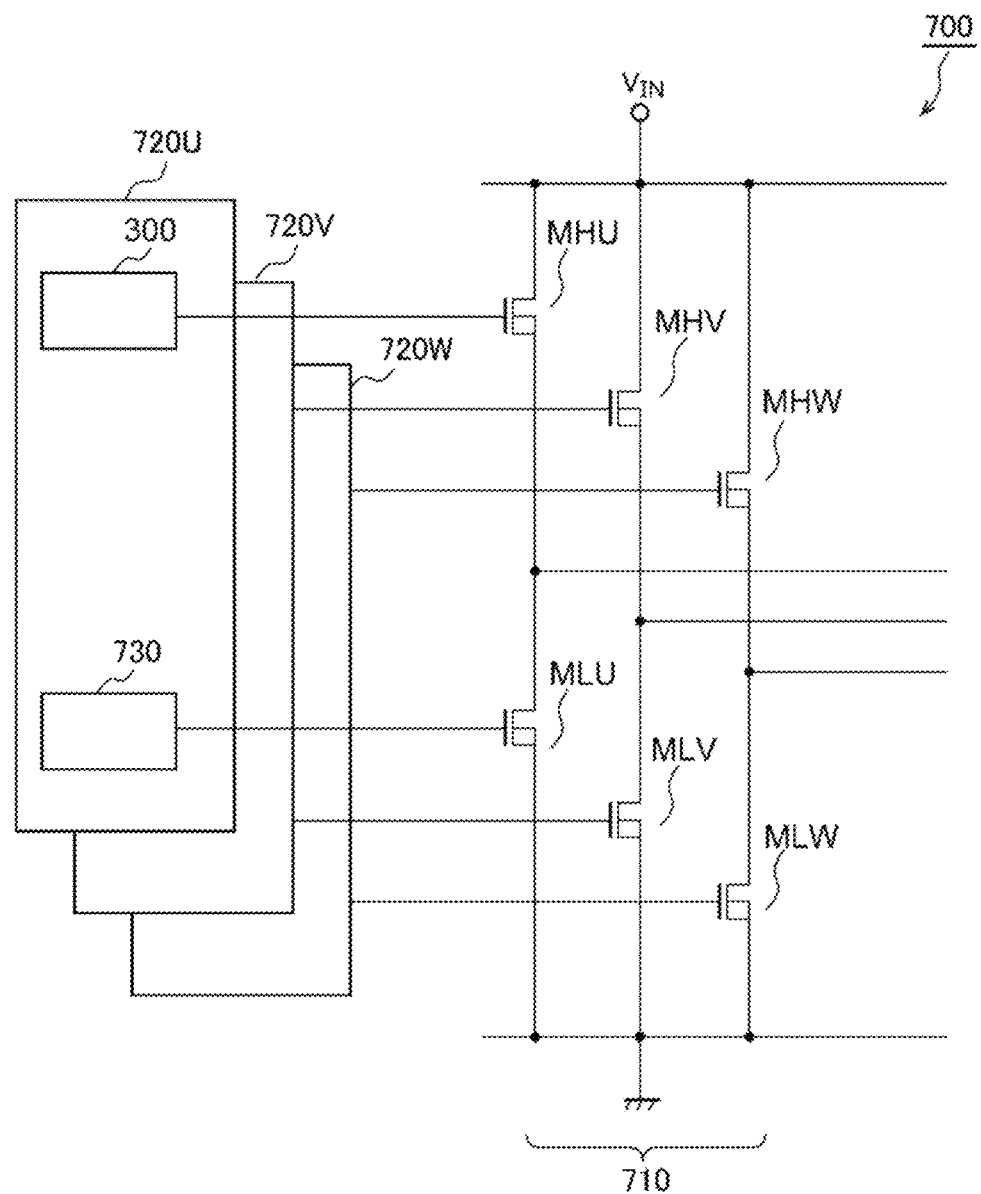
FIG. 9 is a circuit diagram of an inverter device including a drive circuit.

The drive circuit 300 may be used in an inverter device. FIG. 9 shows a circuit diagram of an inverter device 700 including the drive circuit 300. The inverter device 700 includes a three-phase inverter 710, and drive circuits 720U, 720V and 720W of a U phase, a V phase and a W phase. The three-phase inverter 710 has high-side transistors MHU, MHV and MHW, and low-side transistors MLU, MLV and MLW. The drive circuit 720 # (#=U, V or W) includes the high-side drive circuit 300 and a low-side drive circuit 730.

Details of the embodiments of the present disclosure are described as above. It should be understood by the skilled person in the art that, the embodiments are exemplary, and various variations may be made to combinations of the constituting elements and processes, and such variations are encompassed within the scope of the present disclosure. Details of such variation examples are given in the description below.

First Variation Example

In the embodiments, the high-side transistor MH is implemented by an N-channel MOSFET in the description; however, it can also be implemented by an NPN type bipolar transistor or an IGBT. In this case, the gate, source and drain are alternatively referred to as a base, emitter and drain.

Second Variation Example

In the embodiments, the high-side transistor MH and the drive circuit 300 are integrated in the same integrated circuit as an example in the description. However, the present disclosure is not limited to the examples above, and the high-side transistor MH may also be a discrete component.

Third Variation Example

In the DC/DC converter 600 in FIG. 8, the low-side transistor ML may also be replaced by a diode. Moreover, the topology of the DC/DC converter 600 is not limited to a buck converter, and may be in other forms having a high-side transistor.

Fourth Variation Example

The use of the switching circuit 100 is not limited to being a DC/DC converter or an inverter device. For example, the switching circuit 100 may also be applied to a bidirectional converter, a battery charger circuit, or an audio class D amplifier.

Fifth Variation Example

In the embodiments, the high-side power supply line is implemented by a bootstrap line, the high-side ground line is implemented by a switch line, and associated details of voltage fluctuations thereof are described. However, the present disclosure or the application of the present disclosure is not limited to the examples above, and applications to a circuit in which voltages of a high-side power supply line and a high-side ground line are stable may also be implemented. In this case, the auxiliary circuit 460 may be omitted.

The disclosed embodiments are for conveying principles and applications of the present disclosure, and variations and modifications to the configurations may be made to these embodiments without departing from the conceptive scope of the disclosure defined in the appended claims.

What is claimed is:

1. A drive circuit, which is an N-channel or an NPN type high-side transistor drive circuit, comprising:
    a level shift circuit, level-shifting an input signal to a signal that sets a voltage of a high-side power supply line to a high level and a voltage of a high-side ground line to a low level, wherein the level shift circuit includes:
        a pulse generator, generating a first pulse that becomes high level for a certain period of time in response to a first edge of the input signal and a second pulse that becomes high level for a certain period of time in response to a second edge of the input signal;
        an open drain circuit, in which a first output node becomes low level in response to the first pulse and a second output node becomes low level in response to the second pulse;
        a first current mirror circuit, having an input node connected to the first output node of the open drain circuit, and folding back a first current flowing through the first output node of the open drain circuit;
        a second current mirror circuit, having an input node connected to the second output node of the open drain circuit, and folding back a second current flowing through the second output node of the open drain circuit; and
        a first latch circuit, which a state is changed in response to a third current that is an output of the first current mirror circuit, and a fourth current that is an output of the second current mirror circuit, wherein the open drain circuit includes:
a first transistor, which is a high breakdown voltage element, having a gate receiving the first pulse and a drain connected to the first output node;
a second transistor, which is a high breakdown voltage element, having a gate receiving the second pulse and a drain connected to the second output node;
a third transistor, disposed between a source and a ground of the first transistor, and having a gate biased by constant voltage; and
a fourth transistor, disposed between a source and a ground of the second transistor, and having a gate biased by constant voltage,
wherein the first latch circuit includes a cross-coupled first inverter and a cross-coupled second inverter, and
wherein the third transistor and the fourth transistor having same or larger size as low-side transistors of the first inverter and the second inverter, respectively.

2. The drive circuit of claim 1, further including an auxiliary circuit, supplying a first auxiliary current to the drain of the first transistor and a second auxiliary current to the drain of the second transistor in response to an increase in the voltage of the high-side power supply line.

3. The drive circuit of claim 1, wherein the drive circuit further includes a second latch circuit that latches an output of the first latch circuit.

4. The drive circuit of claim 3, wherein the second latch circuit includes:
a third inverter, receiving a first output of the first latch circuit;
a fourth inverter, receiving a second output of the first latch circuit;
an eighth transistor, disposed between the third inverter and the high-side ground line, and having a gate connected to an output node of the fourth inverter; and
a ninth transistor, disposed between the fourth inverter and the high side ground line, and having a gate connected to an output node of the third inverter.

5. The drive circuit of claim 1, being integrated in a semiconductor substrate.

6. A switching circuit, comprising:
a high-side transistor, disposed between an input line and a switching line;
a low-side transistor, disposed between the switching line and a ground line; and
the drive circuit of claim 1 for driving the high-side transistor.

7. A controller of a DC/DC converter, the controller comprising:
a pulse modulator, generating a pulse signal in a manner that an output of the DC/DC converter approximates a target; and
the drive circuit of claim 1, which drives an N channel or an NPN type high-side transistor based on the pulse signal.

8. A drive circuit, which is an N-channel or an NPN type high-side transistor drive circuit, comprising:
a level shift circuit, level-shifting an input signal to a signal that sets a voltage of a high-side power supply line to a high level and a voltage of a high-side ground line to a low level, wherein the level shift circuit includes:
a pulse generator, generating a first pulse that becomes high level for a certain period of time in response to a first edge of the input signal and a second pulse that becomes high level for a certain period of time in response to a second edge of the input signal;
an open drain circuit, in which a first output node becomes low level in response to the first pulse and a second output node becomes low level in response to the second pulse;
a first current mirror circuit, having an input node connected to the first output node of the open drain circuit, and folding back a first current flowing through the first output node of the open drain circuit;
a second current mirror circuit, having an input node connected to the second output node of the open drain circuit, and folding back a second current flowing through the second output node of the open drain circuit; and
a first latch circuit, which a state is changed in response to a third current that is an output of the first current mirror circuit, and a fourth current that is an output of the second current mirror circuit,
wherein the open drain circuit includes:
a first transistor, which is a high breakdown voltage element, having a gate receiving the first pulse and a drain connected to the first output node; and
a second transistor, which is a high breakdown voltage element, having a gate receiving the second pulse and a drain connected to the second output node,
wherein the drive circuit further includes an auxiliary circuit, supplying a first auxiliary current to the drain of the first transistor and a second auxiliary current to the drain of the second transistor in response to an increase in the voltage of the high-side power supply line, and
wherein the auxiliary circuit includes:
a fifth transistor, which is a high breakdown voltage element of same type as the first transistor and the second transistor, having a source which is directly or indirectly grounded and a gate which is biased; and
an impedance circuit, disposed between a drain of the fifth transistor and the high-side power supply line, wherein the first auxiliary current and the second auxiliary current are generated according to a voltage drop of the impedance circuit.

9. The drive circuit of claim 8, wherein the auxiliary circuit further includes:
a sixth transistor, disposed between the high-side power supply line and the drain of the first transistor, and receiving the voltage drop of the impedance circuit between a gate and a source of the sixth transistor; and
a seventh transistor, disposed between the high-side power supply line and the drain of the second transistor, and receiving the voltage drop of the impedance circuit between a gate and a source of the seventh transistor.

10. The drive circuit of claim 8, wherein the drive circuit further includes a second latch circuit that latches an output of the first latch circuit.

11. A drive circuit, which is an N-channel or an NPN type high-side transistor drive circuit, comprising:
a pulse generator, generating a first pulse that becomes high level for a certain period of time in response to a first edge of an input signal and a second pulse that becomes high level for a certain period of time in response to a second edge of the input signal;
a first transistor, being a high breakdown voltage element, and having a gate that receives the first pulse;
a second transistor, being a high breakdown voltage element, and having a gate that receives the second pulse;

a third transistor, disposed between a source and a ground of the first transistor, and having a gate biased by constant voltage;

a fourth transistor, disposed between a source and a ground of the second transistor, and having a gate biased by constant voltage;

a first current mirror circuit, connected to a high-side power supply line and having an input node connected to a drain of the first transistor;

a second current mirror circuit, connected to the high-side power supply line and having an input node connected to a drain of the second transistor;

a first inverter, disposed between the high-side power supply line and a high-side ground line, and having an input node connected to an output node of the first current mirror circuit;

a second inverter, disposed between the high-side power supply line and the high-side ground line, having an input node connected to an output node of the second current mirror circuit and an output node of the first inverter, and having an output node connected to an input node of the first inverter;

a fifth transistor, which is a high breakdown voltage element and has a gate and a grounded source;

an impedance element, disposed between a drain of the fifth transistor and the high-side power supply line;

a sixth transistor, disposed between the high-side power supply line and the drain of the first transistor, and having a gate connected to a node on a low potential side of the impedance element; and a seventh transistor, disposed between the high-side power supply line and the drain of the second transistor, and having a gate connected to the node on the low potential side of the impedance element.

12. The drive circuit of claim 11, being integrated in a semiconductor substrate.

13. A switching circuit, comprising:

a high-side transistor, disposed between an input line and a switching line;

a low-side transistor, disposed between the switching line and a ground line; and the drive circuit of claim 11 for driving the high-side transistor.

14. A controller of a DC/DC converter, the controller comprising:

a pulse modulator, generating a pulse signal in a manner that an output of the DC/DC converter approximates a target; and the drive circuit of claim 11, which drives an N channel or an NPN type high-side transistor based on the pulse signal.

* * * * *